United States Patent
Suzuki et al.

(10) Patent No.: US 11,378,770 B2
(45) Date of Patent: Jul. 5, 2022

(54) LENS BARREL THAT HOLDS LENS GROUPS MOVING FORWARDLY AND BACKWARDLY IN OPTICAL AXIS DIRECTION, IMAGE PICKUP UNIT, AND IMAGE PICKUP APPARATUS

(71) Applicant: CANON KABUSHIKI KAISHA, Tokyo (JP)

(72) Inventors: Kei Suzuki, Chigasaki (JP); Daisuke Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 441 days.

(21) Appl. No.: 16/180,478

(22) Filed: Nov. 5, 2018

(65) Prior Publication Data

US 2019/0137726 A1    May 9, 2019

(30) Foreign Application Priority Data

Nov. 8, 2017    (JP) .............................. JP2017-215594

(51) Int. Cl.
*G02B 7/08*    (2021.01)
*G02B 7/40*    (2021.01)
(Continued)

(52) U.S. Cl.
CPC ................. *G02B 7/08* (2013.01); *G02B 7/10* (2013.01); *G02B 7/102* (2013.01); *G02B 7/40* (2013.01); *G02B 7/282* (2013.01)

(58) Field of Classification Search
CPC . G02B 7/08; G02B 7/10; G02B 7/102; G02B 7/40; G02B 7/282
(Continued)

(56) References Cited

U.S. PATENT DOCUMENTS

2012/0019933 A1*    1/2012    Nakamura ............. G02B 7/102
359/700

FOREIGN PATENT DOCUMENTS

CN    1677151 A    10/2005
CN    101750717 A    6/2010
(Continued)

OTHER PUBLICATIONS

Office Action issued Chinese Appln. No. 201811323002.9 dated Feb. 23, 2021. English translation provided.
(Continued)

*Primary Examiner* — Marin Pichler
*Assistant Examiner* — Mitchell T Oestreich
(74) *Attorney, Agent, or Firm* — Rossi, Kimms & McDowell LLP

(57) ABSTRACT

A lens barrel moves a plurality of lens groups efficiently in an optical axis direction while inhibiting size of the lens barrel from increasing. The lens barrel comprises a plurality of holding members respectively holding optical components, respectively provided with cam followers, and supported movably in optical axis direction, a cam cylinder having cam grooves engaged with the cam followers, and held rotatably around an axis parallel to an optical axis, and a driving unit configured to drive one holding member out of the plurality in the optical axis direction. By driving the one holding member being in the optical axis direction, the cam cylinder rotates, and another holding member out of the plurality is driven in the optical axis direction. The driving unit includes a vibration-type linear actuator configured to generate thrust force to drive the one holding member by an elliptical vibration generated in a vibrator.

20 Claims, 9 Drawing Sheets

(51) Int. Cl.
  *G02B 7/10* (2021.01)
  *G02B 7/28* (2021.01)
(58) Field of Classification Search
  USPC .......................................................... 359/696
  See application file for complete search history.

(56) References Cited

FOREIGN PATENT DOCUMENTS

| | | |
|---|---|---|
| JP | S4824729 U | 7/1973 |
| JP | S6236617 A | 2/1987 |
| JP | H06324252 A | 11/1994 |
| JP | H07306351 A | 11/1995 |
| JP | H09145981 A | 6/1997 |
| JP | 2005057839 A | 3/2005 |
| JP | 2006047673 A | 2/2006 |
| JP | 2008123356 A | 5/2008 |
| JP | 2010107772 A | 5/2010 |
| JP | 2016063664 A | 4/2016 |
| JP | 2017167511 A | 9/2017 |

OTHER PUBLICATIONS

Office Action issued in Japanese Appln. No. 2017-215594 dated Aug. 17, 2021.

\* cited by examiner

LENS BARREL THAT HOLDS LENS GROUPS MOVING FORWARDLY AND BACKWARDLY IN OPTICAL AXIS DIRECTION, IMAGE PICKUP UNIT, AND IMAGE PICKUP APPARATUS

BACKGROUND OF THE INVENTION

Field of the Invention

The present invention relates to a lens barrel, an image pickup unit, and an image pickup apparatus and particularly, relates to a lens barrel that holds a plurality of lens groups moving forwardly and backwardly in an optical axis direction, an image pickup unit including the lens barrel, and an image pickup apparatus including the image pickup unit.

Description of the Related Art

Conventionally, an image pickup apparatus in which a camera unit for shooting a subject is covered by a casing such as a dome and is supported rotatably around a pan axis and a tilt axis, is known. By using the image pickup apparatus, a user can change a direction of the camera unit to a desired shooting direction and can shoot the subject. For the image pickup apparatus, performance improvement and size reduction of an image pickup unit (camera unit) are required. However, for example, if performance of a lens barrel constituting the image pickup unit is improved for the purpose of optimizing a taking lens and increasing zoom magnification, according to a size increase of an image pickup device, an optical path length of the lens barrel increases. As a result, a size of the entire image pickup apparatus including the image pickup unit and the casing covering the image pickup unit increases. As a solution of this problem, a lens barrel that performs zooming by moving a plurality of lens groups linearly in an optical axis direction using a cam ring, is known as the lens barrel that improves the performance of the image pickup unit and realizes miniaturization of the image pickup unit.

For example, in a lens barrel described in Japanese Laid-Open Patent Publication (kokai) No. H06-324252, a screw bar supported rotatably in parallel with an optical axis is rotated to move, in the optical axis direction, a second group lens holding ring provided with a sleeve screwed into the screw bar. In addition, a cam cylinder having a cam groove engaged with a cam follower of the second group lens holding ring is rotated to move, in the optical axis direction, a third group lens holding ring or a diaphragm holding ring. Further, Japanese Laid-Open Patent Publication (kokai) No. H07-306351 describes a lens barrel that includes an ultrasonic motor having a rotation center on an axis different from an optical axis and a cam ring having a rotation center on the same axis as the rotation center of the ultrasonic motor, directly connected to an output member of the ultrasonic motor, and cam-coupled to a movement lens holding member. In this lens barrel, the movement lens holding member is moved in the optical axis direction by rotating the cam ring by the ultrasonic motor.

However, in the conventional technologies, in the case where more lens groups are moved in the optical axis direction to improve the performance of the lens barrel, a torque necessary for rotation of a cam member increases, so that it is necessary to increase the torque using a driving source configured to generate the large torque or using a gear or the like. However, these methods cause a problem that a size of the entire lens barrel increases due to a size increase in the driving source and an increase in the number of components.

SUMMARY OF THE INVENTION

The present invention provides a lens barrel, an image pickup unit, and an image pickup apparatus, which are capable of moving a plurality of lens groups efficiently in an optical axis direction while inhibiting a size of the lens barrel from increasing.

Accordingly, the present invention provides a lens barrel comprising a plurality of holding members respectively holding optical components, respectively provided with cam followers, and supported movably in an optical axis direction, a cam cylinder having cam grooves engaged with the cam followers, and held rotatably around an axis parallel to an optical axis, and a driving unit configured to drive one holding member out of the plurality of holding members in the optical axis direction, wherein by the one holding member being driven in the optical axis direction by the driving unit, the cam cylinder rotates, and another holding member out of the plurality of holding members is driven in the optical axis direction, and wherein the driving unit includes a vibration-type linear actuator that is configured to generate a thrust force to drive the one holding member by an elliptical vibration generated in a vibrator.

According to the present invention, it is possible to move a plurality of lens groups efficiently in an optical axis direction while inhibiting size of a lens barrel, and thus an image pickup unit, from increasing.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
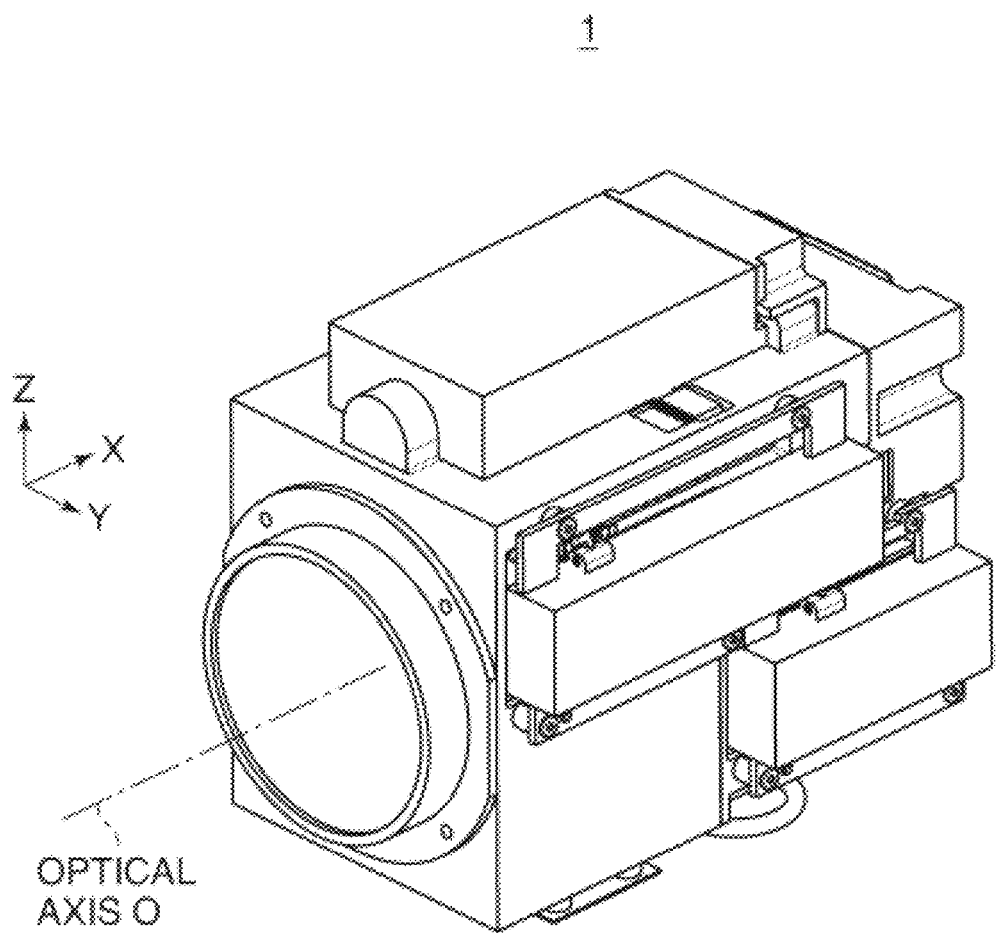
FIG. 1 is an external perspective view of an image pickup unit according to an embodiment of the present invention.

FIG. 1 is an external perspective view of an image pickup unit 1 according to an embodiment of the present invention. For convenience of explanation, as shown in FIG. 1, an X-axis, a Y-axis, and a Z-axis orthogonal to one another are defined. An axis parallel to a shooting optical axis O (hereinafter, referred to as the "optical axis O") of the image pickup unit 1 is defined as the X-axis. It is defined that the X-axis is parallel to a horizontal direction in the posture shown in FIG. 1, wherein an axis parallel to a vertical direction is defined as the Z-axis and an axis orthogonal to the X-axis and the Z-axis and parallel to the horizontal direction is defined as the Y-axis.

Figure 2:
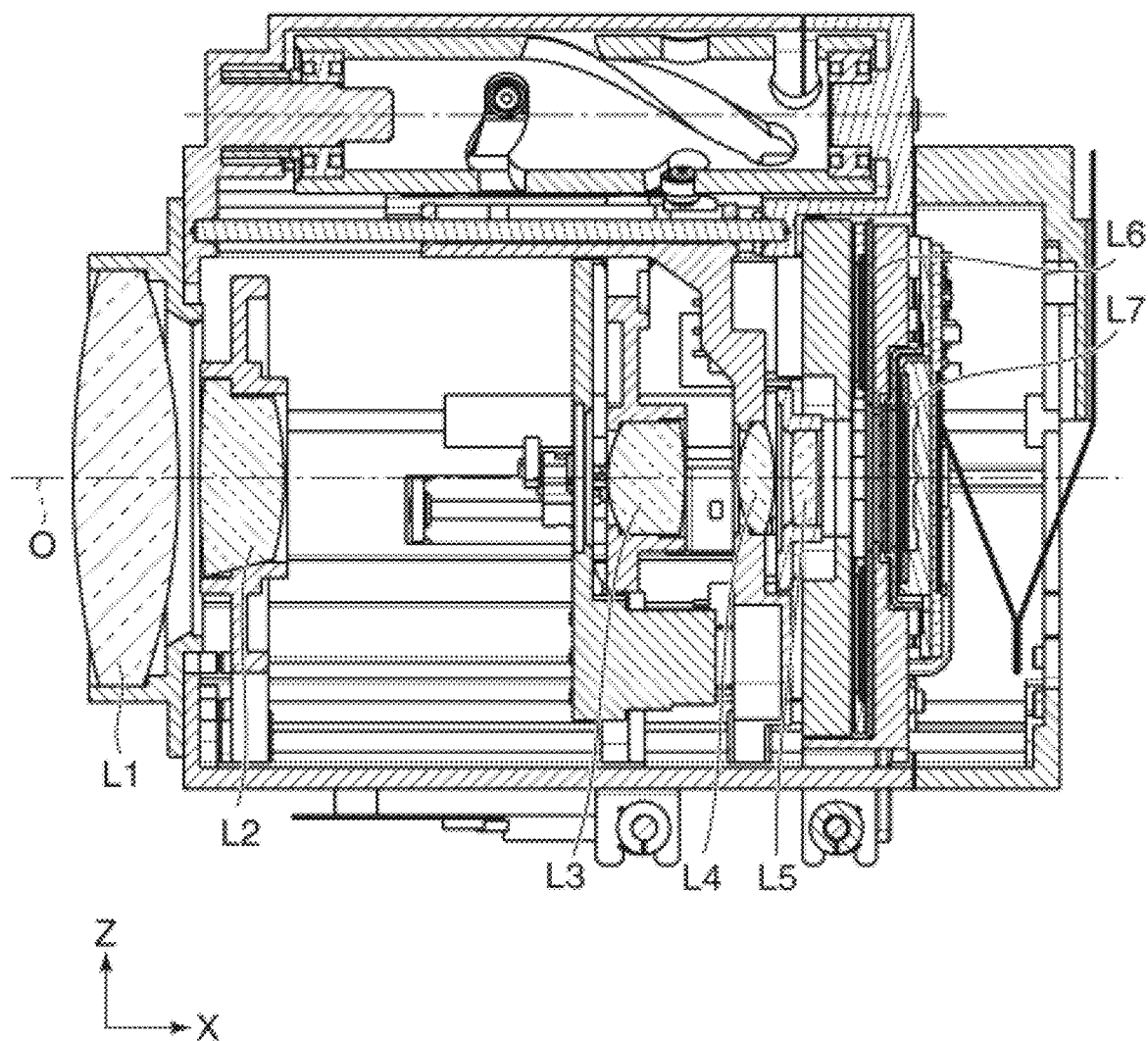
FIG. 2 is a cross-sectional view of the image pickup unit in a plane including an optical axis.
Figure 3:
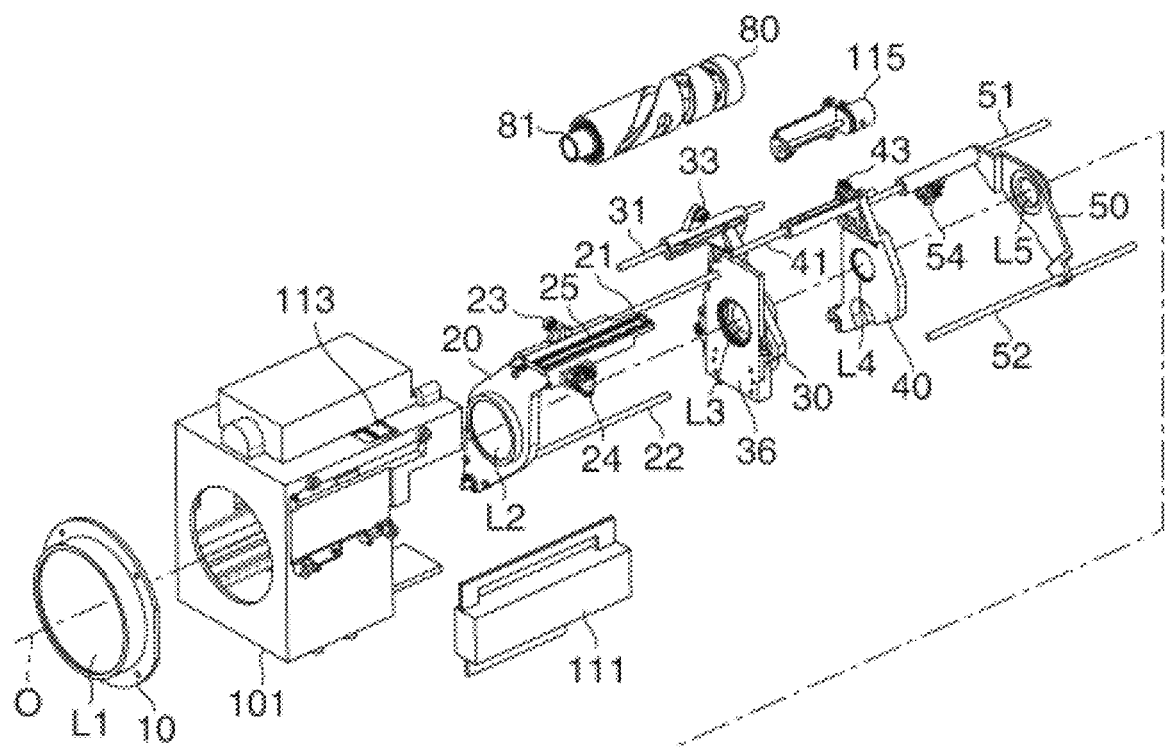
FIG. 3 is an exploded perspective view of the image pickup unit.
Figure 3:
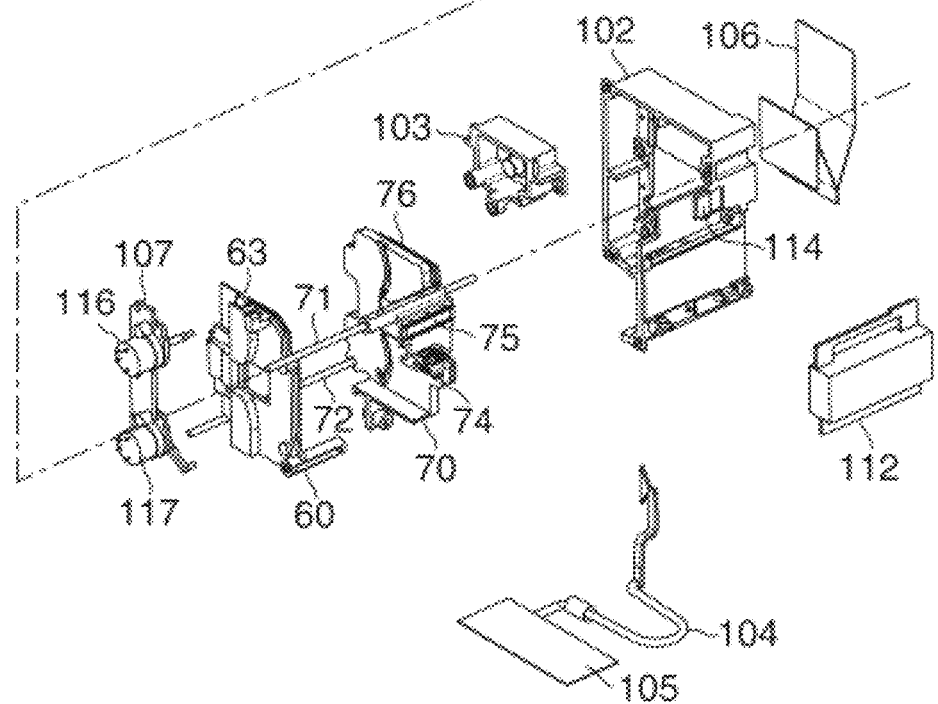

FIG. 2 is a cross-sectional view showing the image pickup unit 1 cut along a plane including the optical axis O and parallel to the Z-axis. FIG. 3 is an exploded perspective view of the image pickup unit 1. The image pickup unit 1 includes optical components disposed sequentially from the subject side to form a lens barrel (shooting optical system), that is, a first group lens L1, a second group lens L2, a third group lens L3, a fourth group lens L4, a fifth group lens L5, and an optical filter L6. The image pickup unit 1 further includes an image pickup device L7. Light having passed through the lens barrel forms an image on the image pickup device L7.

The first group lens L1 is fixed not to be movable in an optical axis direction. Each of the second group lens L2, the third group lens L3, and the fourth group lens L4 moves in the optical axis direction thereby performing a zooming operation (zooming). The fifth group lens L5 moves in the optical axis direction thereby performing a focusing operation (focusing). The optical filter L6 is, for example, an IR cut filter or a band-pass filter. The optical filter L6 moves in a plane orthogonal to the optical axis O and is inserted or extracted with respect to an optical path, thereby transmitting or blocking light of a specific wavelength region. The image pickup device L7 is a photoelectric conversion device such as a CCD sensor and a CMOS sensor, which converts an imaged optical image into an image signal composed of an electric signal.

The image pickup unit 1 includes a first group barrel 10, a second group barrel 20, guide bars 21 and 22, a cam follower 23, a rack member 24, a position detection scale 25, a third group barrel 30, a guide bar 31, a cam follower 33, a diaphragm unit 36, a fourth group barrel 40, and a guide bar 41. The image pickup unit 1 further includes a cam follower 43, a fifth group barrel 50, guide bars 51 and 52, a rack member 54, an optical filter holding frame 60, and a cam follower 63. The image pickup unit 1 further includes an image pickup device holding frame 70, guide bars 71 and 72, a rack member 74, a position detection scale 75, and a sensor substrate 76.

The first group barrel 10 is a lens holding member that holds the first group lens L1. The second group barrel 20 is a lens holding member that holds the second group lens L2. A sleeve portion of the second group barrel 20 is engaged with the guide bar 21 to guide the second group barrel 20 in the optical axis direction and a U-shaped groove of the second group barrel 20 is engaged with the guide bar 22 to regulate rotation of the second group barrel 20 around the guide bar 21. The cam follower 23, the rack member 24, and the position detection scale 25 are attached to the second group barrel 20. The third group barrel 30 is a lens holding member that holds the third group lens L3. A sleeve portion of the third group barrel 30 is engaged with the guide bar 31 to guide the third group barrel 30 in the optical axis direction and a U-shaped groove of the third group barrel 30 is engaged with the guide bar 22 to regulate rotation of the third group barrel 30 around the guide bar 31. The cam follower 33 is rotatably attached to the third group barrel 30. The diaphragm unit 36 is fixed to the third group barrel 30 and drives diaphragm blades to change an aperture diameter.

The fourth group barrel 40 is a lens holding member that holds the fourth group lens L4. A sleeve portion of the fourth group barrel 40 is engaged with the guide bar 41 to guide the fourth group barrel 40 in the optical axis direction and a U-shaped groove of the fourth group barrel 40 is engaged with the guide bar 22 to regulate rotation of the fourth group barrel 40 around the guide bar 41. The cam follower 43 is rotatably attached to the fourth group barrel 40. The fifth group barrel 50 is a lens holding member that holds the fifth group lens L5. A sleeve portion of the fifth group barrel 50 is engaged with the guide bar 51 to guide the fifth group barrel 50 in the optical axis direction and a U-shaped groove of the fifth group barrel 50 is engaged with the guide bar 52 to regulate rotation of the fifth group barrel 50 around the guide bar 51. The rack member 54 is attached to the fifth group barrel 50.

The optical filter holding frame 60 is a holding member that holds the optical filter L6. A sleeve portion of the optical filter holding frame 60 is engaged with the guide bar 52 to guide the optical filter holding frame 60 in the optical axis direction and a U-shaped groove of the optical filter holding frame 60 is engaged with the guide bar 51 to regulate rotation of the optical filter holding frame 60 around the guide bar 52. The cam follower 63 is rotatably attached to the optical filter holding frame 60. The image pickup device holding frame 70 holds the image pickup device L7. The sensor substrate 76 is attached to the image pickup device holding frame 70. A sleeve portion of the image pickup device holding frame 70 is engaged with the guide bar 71 to guide the image pickup device holding frame 70 in the optical axis direction and a U-shaped groove of the image pickup device holding frame 70 is engaged with the guide bar 72 to regulate rotation of the image pickup device holding frame 70 around the guide bar 71. The rack member 74 and the position detection scale 75 are attached to the image pickup device holding frame 70.

Figure 4:
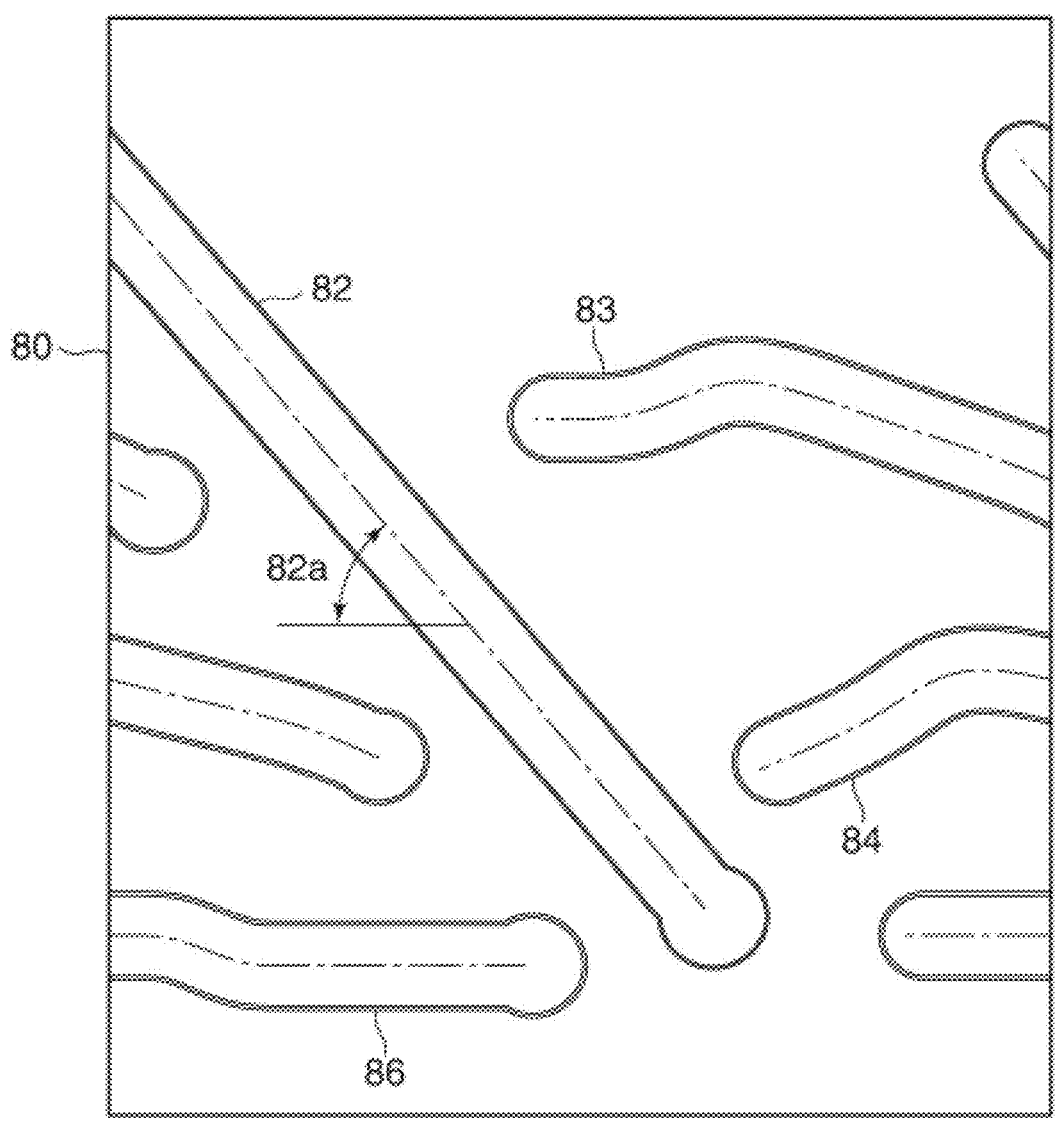
FIG. 4 is a development view showing cam grooves of a cam cylinder included in the image pickup unit.

The image pickup unit 1 includes a cam cylinder 80. FIG. 4 is a development view showing cam grooves formed on the cam cylinder 80. The cam cylinder 80 is provided with a second group cam groove 82, a third group cam groove 83, a fourth group cam groove 84, and an optical filter cam groove 86. The second group cam groove 82 is engaged with the cam follower 23 of the second group barrel 20. The third group cam groove 83 is engaged with the cam follower 33 of the third group barrel 30. The fourth group cam groove 84 is engaged with the cam follower 43 of the fourth group barrel 40. The optical filter cam groove 86 is engaged with the cam follower 63 of the optical filter holding frame 60.

The image pickup unit 1 includes a fixation barrel 101, a rear part barrel 102, a guide bar holding member 103, an optical filter insertion/extraction motor holding member 107, a cam cylinder biasing member 81, linear actuators 111 and 112, optical sensors 113 and 114, and a stepping motor 115.

The first group barrel 10, the guide bar holding member 103, and the optical filter insertion/extraction motor holding member 107 are fixed to the fixation barrel 101. The guide bars 21, 22, 51, 52, 71, and 72 are sandwiched and held between the fixation barrel 101 and the rear part barrel 102. The guide bars 31 and 41 are sandwiched and held between the fixation barrel 101 and the guide bar holding member 103. The cam cylinder biasing member 81 biases the cam cylinder 80 in the optical axis direction. The cam cylinder 80 is rotatably sandwiched and held between the fixation barrel 101 and the rear part barrel 102 through the cam cylinder biasing member 81 and a rotation center axis of the cam cylinder 80 is parallel to the optical axis O.

The optical sensor 113 is fixed to the fixation barrel 101 and the optical sensor 114 is fixed to the rear part barrel 102.

The optical sensors 113 and 114 have the same structure. The optical sensor 113, which has a light emitting portion and a light receiving portion, converts light of a periodic light/dark pattern reflected on the position detection scale 25 attached to the second group barrel 20 into an electric signal, and detects a position of the second group barrel 20. Similarly, the optical sensor 114, which has a light emitting portion and a light receiving portion, converts light of a periodic light/dark pattern reflected on the position detection scale 75 attached to the image pickup device holding frame 70 into an electric signal, and detects a position of the image pickup device holding frame 70.

Each of the linear actuators 111 and 112 is a vibration-type linear actuator using a piezoelectric element (electrostrictive element) in the present embodiment, and includes a slider (slid material) and a vibrator (not shown in the drawings) relatively movable in the optical axis direction. However, it should be noted that each of the linear actuators 111 and 112 is not limited to the vibration-type linear actuator using the piezoelectric element. In the vibration-type linear actuators, if an alternating voltage signal having a predetermined frequency is input to the vibrator via a flexible printed board (not shown), a substantially elliptical motion (substantially elliptical vibration) is generated in the vibrator. As a result, a thrust force (driving force) can be generated on a pressure contact surface between the slider and the vibrator. By the thrust force, a relative movement is generated in the slider and the vibrator.

The linear actuator 111 is fixed to the fixation barrel 101 and a member, out of the slider and the vibrator, movable in the optical axis direction is engaged with the rack member 24. If the thrust force in the optical axis direction is generated in the linear actuator 111, the second group barrel 20 moves forwardly and backwardly in the optical axis direction via the rack member 24. If the second group barrel 20 moves forwardly and backwardly in the optical axis direction, the cam cylinder 80 engaged with the cam follower 23 of the second group barrel rotates. If the cam cylinder 80 rotates, the third group barrel 30, the fourth group barrel 40, and the optical filter holding frame 60 move forwardly and backwardly in the optical axis direction via the cam followers 33, 43, and 63 engaged with the cam cylinder 80, respectively. That is, a plurality of optical components (the second group lens L2, the third group lens L3, the fourth group lens L4, and the optical filter L6) can be driven in the optical axis direction by one linear actuator 111.

The linear actuator 112 is fixed to the rear part barrel 102 and a member, out of the slider and the vibrator, movable in the optical axis direction is engaged with the rack member 74. If the thrust force in the optical axis direction is generated in the linear actuator 112, the image pickup device holding frame 70 moves forwardly and backwardly in the optical axis direction via the rack member 74. That is, by the linear actuators 111 and 112 being driven, the second group barrel 20, the third group barrel 30, the fourth group barrel 40, the optical filter holding frame 60, and the image pickup device holding frame 70 are moved forwardly and backwardly in the optical axis, so that the zooming operation can be performed.

The stepping motor 115 is fixed to the fixation barrel 101 and is engaged with the rack member 54. If the stepping motor 115 is driven, the thrust force of the optical axis direction is generated and thus the fifth group barrel 50 is moved forwardly and backwardly in the optical axis direction via the rack member 54, so that the focusing operation can be performed.

Figure 5:
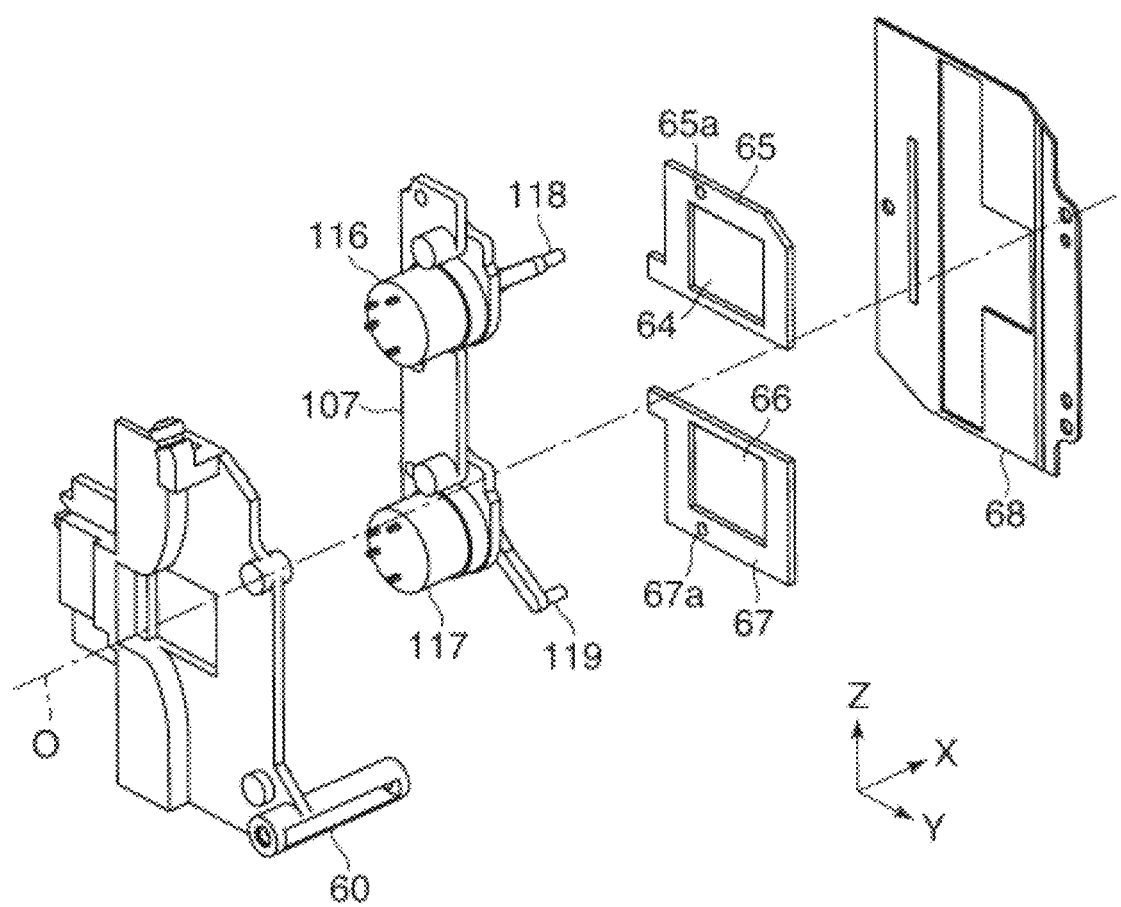
FIG. 5 is an exploded perspective view of an optical filter driving mechanism included in the image pickup unit.

The image pickup unit 1 includes optical filter insertion/extraction motors 116 and 117, an electric wiring line 104, a lens substrate 105, and a heat conduction member 106. The optical filter insertion/extraction motors 116 and 117 are fixed to the optical filter insertion/extraction motor holding member 107. The optical filter insertion/extraction motors 116 and 117 are a part of components to form an optical filter driving mechanism. FIG. 5 is an exploded perspective view of the optical filter driving mechanism. The optical filter driving mechanism further includes an IR cut filter 64, filter holding frames 65 and 67, a band-pass filter 66, a cover member 68, and engagement arms 118 and 119.

The IR cut filter 64 has an optical characteristic of cutting infrared light. The filter holding frame 65 holds the IR cut filter 64. The band-pass filter 66 has an optical characteristic of transmitting light of a specific wavelength region. The filter holding frame 67 holds the band-pass filter 66. The filter holding frames 65 and 67 are held movably in a plane orthogonal to the optical axis O between the cover member 68 and the optical filter holding frame 60. The engagement arms 118 and 119 are coupled to the optical filter insertion/extraction motors 116 and 117, respectively. In addition, the engagement arms 118 and 119 are engaged with engagement holes 65a and 67a provided on the filter holding frames 65 and 67, respectively.

By driving the optical filter insertion/extraction motors 116 and 117 and thus rotating output shafts thereof around an axis parallel to the optical axis O, the engagement arms 118 and 119 rotate and thus the filter holding frames 65 and 67 rotate. By controlling a rotation direction of the optical filter insertion/extraction motors 116 and 117, the filter holding frames 65 and 67 can be inserted and extracted with respect to the optical path. In a case where the filter holding frame 65 (IR cut filter 64) is inserted into the optical path, light from which the infrared light has been cut is incident on the image pickup device L7. As a result, light suitable for generating a normal color image is obtained. In a case where the filter holding frame 67 (band-pass filter 66) is inserted into the optical path, only light of a specific wavelength region such as near-infrared light is incident on the image pickup device L7, so that a higher contrast image can be generated. In a case where the filter holding frames 65 and 67 are extracted from the optical path, light including the infrared light is incident on the image pickup device L7, so that a larger amount of light is obtained, and thus for example, shooting is enabled even under a low illumination environment such as the night time.

The lens substrate 105, which is fixed to the fixation barrel 101, feeds power to components requiring power feeding and inputs and outputs an electric signal between the components, via a flexible printed board (not shown). It should be noted that the components requiring the power feeding via the flexible printed board are the linear actuators 111 and 112, the stepping motor 115, the optical filter insertion/extraction motors 116 and 117, the optical sensors 113 and 114, and the like. The electric wiring line 104 is bent in a U shape. One end of the electric wiring line 104 is connected to the sensor substrate 76 and fixed, and the other end of the electric wiring line 104 is connected to the lens substrate 105 and fixed. The electric wiring line 104 inputs and outputs an electric signal with respect to the image pickup device L7 held by the sensor substrate 76. A curvature of the electric wiring line 104 is designed such that the thrust force of the linear actuator 112, which is necessary for moving the image pickup device holding frame 70 in the optical axis direction, does not excessively increase.

The heat conduction member 106 is made of a flexible sheet member having high thermal conductivity such as a graphite sheet. One end of the heat conduction member 106 is fixed to the sensor substrate 76, and the other end of the heat conduction member 106 is fixed to a heat sink (not shown). The heat conduction member 106 suppresses a temperature rise of the image pickup device L7 by conducting heat generated by the sensor substrate 76 to the heat sink. The heat conduction member 106 is folded in a bellows shape on the rear side (eyepiece side) of the image pickup device holding frame 70 along the optical axis O, such that the thrust force of the linear actuator 112, which is necessary for moving the image pickup device holding frame 70 in the optical axis direction, does not excessively increase.

Figure 6:
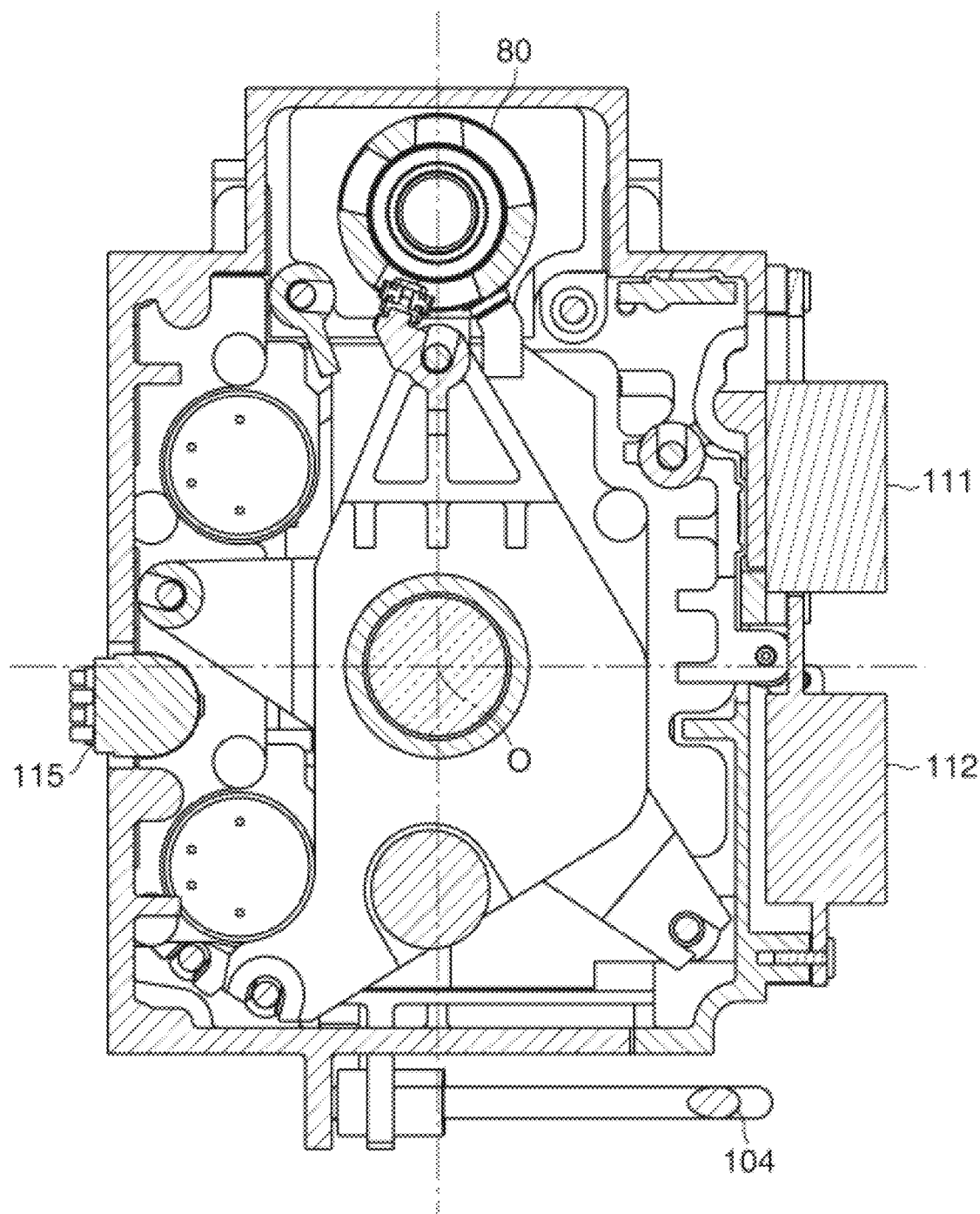
FIG. 6 is a cross-sectional view of the image pickup unit in a plane orthogonal to the optical axis.

FIG. 6 is a cross-sectional view of a cross-section of the image pickup unit 1 cut along a plane (YZ-plane) orthogonal to the optical axis O when viewed from the front side of the image pickup unit 1. The linear actuators 111 and 112 are disposed on a +Y-direction side surface (first side surface) of the image pickup unit 1, with respect to the optical axis O. The stepping motor 115 is disposed on a −Y-direction side surface of the image pickup unit 1. The cam cylinder 80 is disposed in the vicinity of a +Z-direction side surface (second side surface) of the image pickup unit 1. A length of a +Y-direction side surface orthogonal to the optical axis O is larger than a length of a +Z-direction side surface orthogonal to the optical axis O. The electric wiring line 104 is disposed on a −Z-direction side surface of the image pickup unit 1 while being bent in a plane substantially parallel to the XY-plane.

Figure 7:
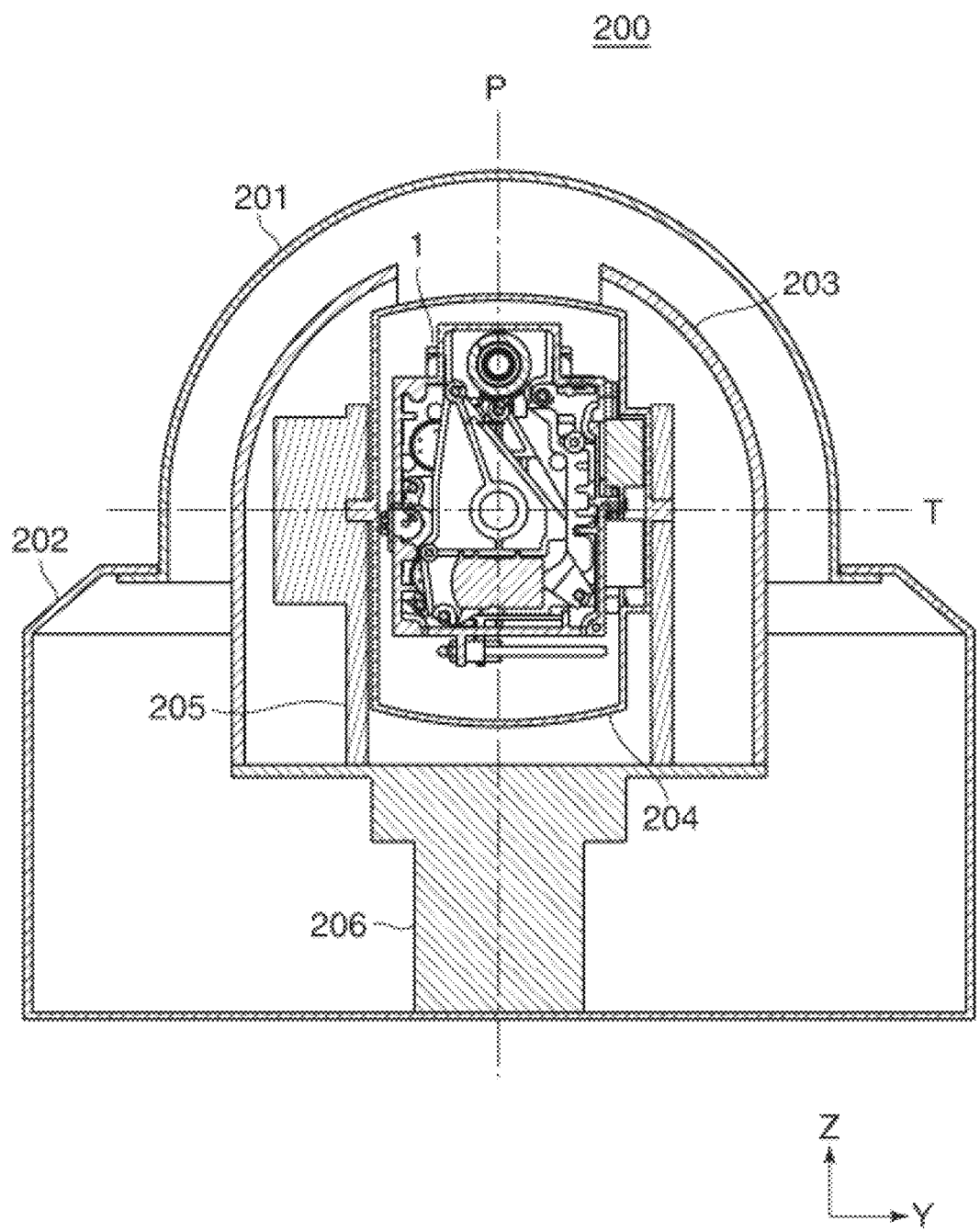
FIG. 7 is a cross-sectional view of a monitoring camera including the image pickup unit in a plane orthogonal to the optical axis.

FIG. 7 is a cross-sectional view of a monitoring camera 200 to be an example of the image pickup apparatus including the image pickup unit 1, cut along a plane orthogonal to the optical axis O. The monitoring camera 200 includes a dome 201, a case 202, an inner cover 203, a camera case 204, a tilt unit 205, and a pan unit 206. The image pickup unit 1 is held in the camera case 204. The tilt unit 205 has a tilt driving portion formed of a stepping motor or the like (not shown) and supports the camera case 204 rotatably around the tilt axis T. By driving the tilt unit 205 and electrically driving the camera case 204 in a tilt direction, the image pickup unit 1 accommodated in the camera case 204 is tilt-driven.

The inner cover 203 is supported by the pan unit 206 while the inner cover 203 covers the camera case 204 and the tilt unit 205. In addition, the tilt unit 205 is supported by the pan unit 206. The pan unit 206 has a pan driving portion formed of a stepping motor or the like (not shown) and supports the tilt unit 205 rotatably around the pan axis P. By driving the pan unit 206 and electrically driving the tilt unit 205 in a pan direction, the image pickup unit 1 accommodated in the camera case 204 is pan-driven. In this way, in the monitoring camera 200, the image pickup unit 1 is rotatable around each of two axes of the pan axis P and the tilt axis T. The case 202 holds the pan unit 206 therein, accommodates the inner cover 203, and holds the dome 201. The dome 201 is, for example, a hemispherical member formed of transparent or translucent plastic and covers the inner cover 203.

Figure 8:
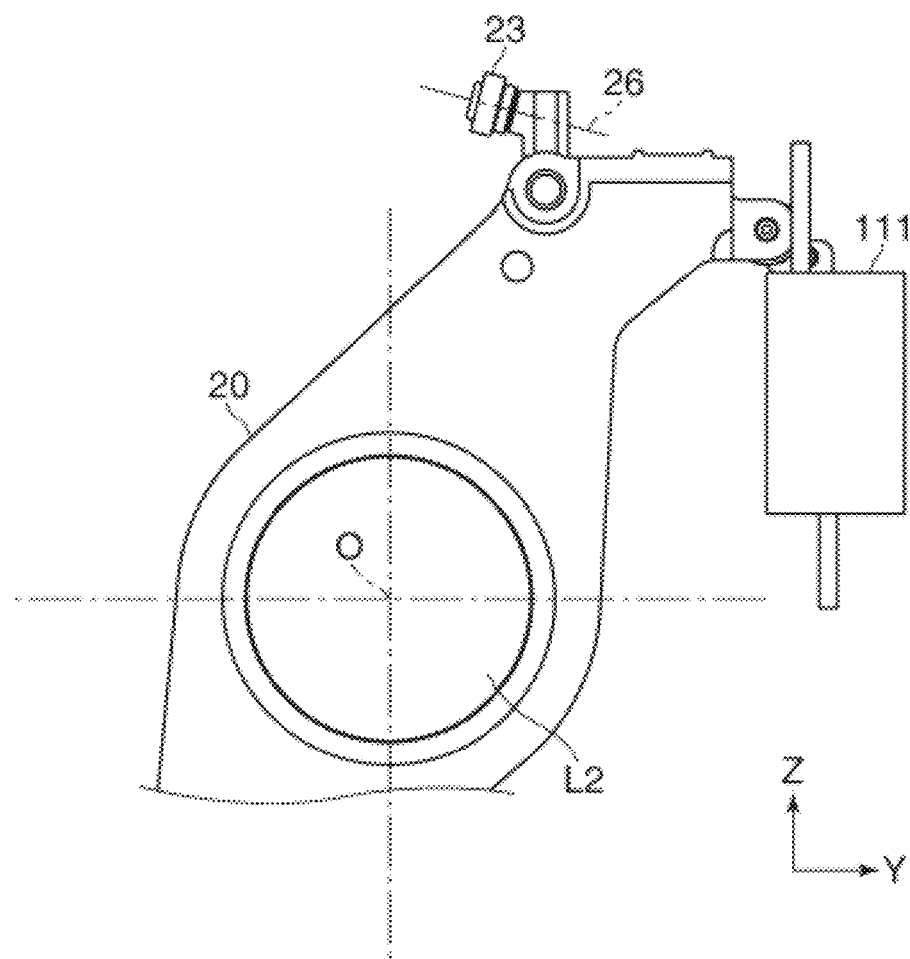
FIG. 8 is a front view showing a peripheral structure of a cam follower included in the image pickup unit.

FIG. 8 is a front view showing a peripheral structure of the cam follower 23. The cam follower 23 is attached to the second group barrel 20 rotatably around a rotation axis 26 included in the YZ-plane that is orthogonal to the optical axis O. A direction of the vibration generated in the vibrator of the linear actuator 111 is a ±Y-direction (substantially elliptical vibration in the XY-plane) and is a direction which the cam follower 23 is inserted to or extracted from with respect to the second group cam groove 82. Therefore, the vibration generated in the linear actuator 111 can be prevented from being transmitted to the cam cylinder 80.

As described above, in the image pickup unit 1, the cam cylinder 80 is rotated by driving the second group barrel 20 in the optical axis direction by the thrust force of the linear actuator 111, and the third group barrel 30, the fourth group barrel 40, and the optical filter holding frame 60 are moved forwardly and backwardly in the optical axis direction. By this configuration, a plurality of lens groups can be driven by one linear actuator 111 without requiring an increase in the size of a driving portion or deceleration using a gear or the like. That is, many lens groups can be driven without increasing the size of the image pickup unit 1.

In addition, the second group cam groove 82 has a substantially linear shape. That is, a direction of an intersection angle of the second group cam groove 82 is constant. In addition, as shown in FIG. 4, a degree of a cam intersection angle 82a of the second group cam groove 82 is substantially constant at about 50°. In this way, by setting the degree of the cam intersection angle 82a to a relatively large value and causing the cam intersection angle 82a to be substantially constant, the thrust force of the linear actuator 111 can be efficiently converted into a rotational force for the cam cylinder 80. It should be noted that, although the degree of the cam intersection angle 82a is described as about 50° above, the degree of the cam intersection angle 82a is not limited thereto and can be set to an angle larger than 45°, for example. An upper limit value of the degree of the cam intersection angle 82a is determined according to a movement distance necessary for the lens group to be moved in the optical axis direction by the rotation of the cam cylinder 80.

Figure 9:
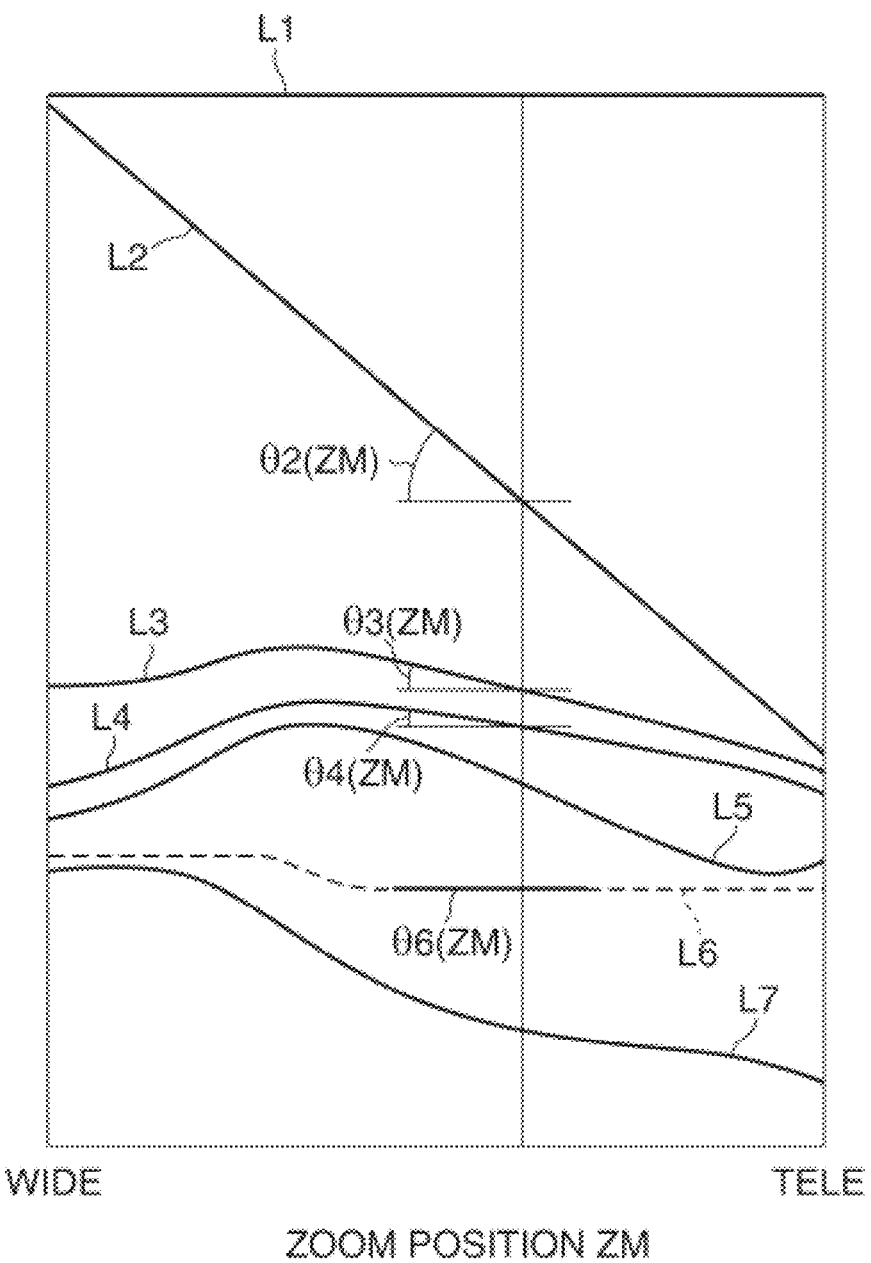
FIG. 9 is a diagram showing a movement locus of a lens group and the like included in the image pickup unit.

FIG. 9 is a diagram showing movement loci of the first group lens L1 to the fifth group lens L5, the optical filter L6, and the image pickup device L7 constituting an image pickup optical system of the image pickup unit 1. An angle θ2(ZM) shown in FIG. 9 shows a cam intersection angle at a zoom position ZM (engagement position of the cam follower in the second group cam groove 82) of the second group cam groove 82. It should be noted that the zoom position ZM is an arbitrary zoom position in a range in which a shooting field angle can be changed, that is, a range between the TELE side (telephoto side) and the WIDE side (wide angle side). An angle θ3(ZM) shows a cam intersection angle at a zoom position ZM of the third group cam groove 83. An angle θ4(ZM) shows a cam intersection angle at a zoom position ZM of the fourth group cam groove 84. An angle θ6(ZM) shows a cam intersection angle at a zoom position ZM of the optical filter cam groove 86.

As described above, the second group barrel 20, the third group barrel 30, the fourth group barrel 40, and the optical filter holding frame 60 move in the optical axis direction by the thrust force of the linear actuator 111. At this time, it is desirable to implement movement loci satisfying |θ2(ZM)|>|θn(ZM)| (wherein n=3, 4, 6). In this way, the second group barrel 20, the third group barrel 30, the fourth group barrel 40, and the optical filter holding frame 60 can be efficiently driven by the thrust force of the linear actuator 111. In addition, in consideration of respective sliding loads between the second group barrel 20, the third group barrel 30, the fourth group barrel 40, and the optical filter holding frame 60, and the guide bars engaged with them, it is desirable to take the following configurations. That is, friction coefficients of sliding portions between the second group barrel 20, the third group barrel 30, the fourth group barrel 40, and the optical filter holding frame 60, and the guide bars engaged with them are defined as μn (wherein n=2, 3, 4, 6). At this time, it is desirable to select movement loci and friction coefficients satisfying $\cot(\theta 2(ZM))+\mu 2<\cot(\theta n(ZM))-\mu n$ (n=3, 4, 6). In this way, the second group barrel 20, the third group barrel 30, the fourth group barrel 40, and the optical filter holding frame 60 can be driven more efficiently by the thrust force of the linear actuator 111.

As described above, in the image pickup unit according to the present invention, it is possible to efficiently move, in the optical axis direction, a plurality of components such as the lens groups, which need to be moved in the optical axis direction. Therefore, for example, even in a case where more lens groups are disposed in the shooting optical system to increase zoom magnification, there is no need for a motor (driving source) that is configured to generate a larger torque or a speed conversion gear. In addition, for example, even in a case where it is necessary to increase sizes of various lenses to use an image pickup device having a wide light receiving area, it is possible to inhibit a size of the motor from increasing. That is, with the image pickup unit according to the present invention, it is possible to improve performance of the image pickup unit while inhibiting the size of the entire image pickup unit from increasing.

While the present invention has been described in detail on the basis of the preferred embodiments, the present invention is not limited to these specific embodiments and various embodiments within a scope not departing from the gist of the present invention are also included in the present invention. For example, in the image pickup unit 1 mentioned above, the fifth group barrel 50 is driven by the stepping motor 115 and the image pickup device holding frame 70 is driven by the linear actuator 112. In contrast, the image pickup device holding frame 70 may be driven by the stepping motor 115 and the fifth group barrel 50 may be driven by the linear actuator 112, without changing the arrangement positions of the linear actuator 112 and the stepping motor 115. In addition, in the embodiment mentioned above, it is described that the image pickup device holding frame 70 is movable in the optical axis direction. However, the image pickup device holding frame 70 may be fixed to a predetermined position on the optical axis O. In this case, it is possible to realize size reduction, weight reduction and power saving of the image pickup unit by reduction of a driving mechanism.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215594, filed Nov. 8, 2017, which is hereby incorporated by reference wherein in its entirety.

What is claimed is:
1. A lens barrel comprising:
a plurality of holding members respectively holding optical components, respectively provided with cam followers, and supported movably in an optical axis direction;
a cam cylinder having cam grooves engaged with the cam followers, and held rotatably around an axis parallel to an optical axis and occupying a different space than the optical axis; and
a driving unit configured to drive one holding member out of the plurality of holding members in the optical axis direction,
wherein by the one holding member being driven in the optical axis direction by the driving unit, the cam cylinder rotates, and another holding member out of the plurality of holding members is driven in the optical axis direction, and
wherein the driving unit is a vibration-type linear actuator that is configured to generate a thrust force to drive the one holding member by an elliptical vibration generated in a vibrator.

2. The lens barrel according to claim 1, wherein a direction of an intersection angle of the cam groove engaged with the cam follower of the one holding member is constant.

3. The lens barrel according to claim 2, wherein a degree of the intersection angle of the cam groove engaged with the cam follower of the one holding member is substantially constant.

4. The lens barrel according to claim 2, wherein in a case where an intersection angle at an engagement position of the cam follower of the one holding member with respect to the cam cylinder is defined as θ(ZM) and an intersection angle at an engagement position of the cam follower of the another holding member out of the plurality of holding members with respect to the cam cylinder is defined as θn(ZM), |θ(ZM)|>θn(ZM)| is established.

5. The lens barrel according to claim 4, wherein θ(ZM) >45° is established.

6. The lens barrel according to claim 4, wherein in a case where a friction coefficient of a sliding portion when the one holding member is driven in the optical axis direction is defined as p and a friction coefficient of the sliding portion when the another holding member is driven in the optical axis direction is defined as μn, $\cot(\theta(ZM))+\mu<\cot(\theta n(ZM))-\mu n$ is established.

7. The lens barrel according to claim 1,
wherein a rotation axis of the cam follower provided on the one holding member is orthogonal to the optical axis.

8. The lens barrel according to claim 1,
wherein the driving unit is disposed on a first side surface of the lens barrel.

9. The lens barrel according to claim 8, wherein the cam cylinder is disposed on a second side surface orthogonal to the first side surface of the lens barrel.

10. The lens barrel according to claim 9, wherein a length of a side of the first side surface orthogonal to the optical axis is larger than a length of a side of the second side surface orthogonal to the optical axis.

11. An image pickup unit comprising:
a lens barrel; and
an image pickup device on which light having passed through the lens barrel forms an image,
wherein the lens barrel comprises a plurality of holding members respectively holding optical components, respectively provided with cam followers, and supported movably in an optical axis direction, a cam cylinder having cam grooves engaged with the cam followers, and held rotatably around an axis parallel to an optical axis, and a driving unit configured to drive one holding member out of the plurality of holding members in the optical axis direction,
wherein the axis occupies a different space than the optical axis,
wherein by the one holding member being driven in the optical axis direction by the driving unit, the cam cylinder rotates, and another holding member out of the plurality of holding members is driven in the optical axis direction, and wherein the driving unit is a vibration-type linear actuator that is configured to generate a thrust force to drive the one holding member by an elliptical vibration generated in a vibrator.

12. The image pickup unit according to claim 11, wherein a direction of an intersection angle of the cam groove engaged with the cam follower of the one holding member is constant.

13. The image pickup unit according to claim 12, wherein a degree of the intersection angle of the cam groove engaged with the cam follower of the one holding member is substantially constant.

14. The image pickup unit according to claim 12, wherein in a case where an intersection angle at an engagement position of the cam follower of the one holding member with respect to the cam cylinder is defined as $\theta(ZM)$ and an intersection angle at an engagement position of the cam follower of the another holding member out of the plurality of holding members with respect to the cam cylinder is defined as $\theta n(ZM)$, $|\theta(ZM)|>|\theta n(ZM)|$ is established.

15. The image pickup unit according to claim 14, wherein $\theta(ZM)>45°$ is established.

16. An image pickup apparatus comprising:
an image pickup unit including a lens barrel and an image pickup device on which light having passed through the lens barrel forms an image;
two first driving units configured to rotate the image pickup unit around respective two axes which are orthogonal to an optical axis of the lens barrel and orthogonal to each other; and
a hemispherical cover configured to cover the image pickup unit,
wherein the lens barrel comprises a plurality of holding members respectively holding optical components, respectively provided with cam followers, and supported movably in an optical axis direction, a cam cylinder having cam grooves engaged with the cam followers, and held rotatably around an axis parallel to an optical axis and occupying a different space than the optical axis, and a second driving unit configured to drive one holding member out of the plurality of holding members in the optical axis direction,
wherein by the one holding member being driven in the optical axis direction by the second driving unit, the cam cylinder rotates, and another holding member out of the plurality of holding members is driven in the optical axis direction, and
wherein the second driving unit includes a vibration-type linear actuator that is configured to generate a thrust force to drive the one holding member by an elliptical vibration generated in a vibrator.

17. The image pickup apparatus according to claim 16, wherein a direction of an intersection angle of the cam groove engaged with the cam follower of the one holding member is constant.

18. The image pickup apparatus according to claim 17, wherein a degree of the intersection angle of the cam groove engaged with the cam follower of the one holding member is substantially constant.

19. The image pickup apparatus according to claim 17, wherein in a case where an intersection angle at an engagement position of the cam follower of the one holding member with respect to the cam cylinder is defined as $\theta(ZM)$ and an intersection angle at an engagement position of the cam follower of the another holding member out of the plurality of holding members with respect to the cam cylinder is defined as $\theta n(ZM)$, $|\theta(ZM)|>|\theta n(ZM)|$ is established.

20. The image pickup apparatus according to claim 19, wherein $\theta(ZM)>45°$ is established.

* * * * *